United States Patent [19]
Yasuda et al.

[11] Patent Number: 5,225,752
[45] Date of Patent: Jul. 6, 1993

[54] WIPER SYSTEM

[75] Inventors: Toru Yasuda, Yokosuka; Hideaki Nemoto, Yokohama; Yasuyuki Yamaguchi, Fujisawa; Masayuki Kaneda, Yokohama, all of Japan

[73] Assignee: Nissan Motor Co., Ltd., Yokohama, Japan

[21] Appl. No.: 694,292

[22] Filed: May 3, 1991

[30] Foreign Application Priority Data

May 18, 1990 [JP] Japan ................................ 2-126888

[51] Int. Cl.⁵ .............................................. B60S 1/08
[52] U.S. Cl. ................................. 318/443; 318/DIG. 2
[58] Field of Search ............... 318/443, 444, DIG. 2; 15/250.12, 250.13, 250.16, 250.17

[56] References Cited

U.S. PATENT DOCUMENTS 4,599,546  7/1986  Uemura ............................. 318/443
4,663,575  5/1987  Juzswik et al. .................... 318/444
4,665,488  5/1987  Graham et al. ................... 364/424

FOREIGN PATENT DOCUMENTS

61-139542  6/1986  Japan .
62-198549  9/1987  Japan .

*Primary Examiner*—Bentsu Ro
*Attorney, Agent, or Firm*—Foley & Lardner

[57] ABSTRACT

A wiper system for wiping a windshield of an automotive vehicle. The wiper system is comprised of a wiper arm to which a wiper blade is movably fixed. The wiper arm is driven by a wiper motor through a link mechanism so as to move the wiper blade in such a manner that the moving speed of the wiper blade is accelerated at an initial period and decelerated at the remaining period in a stroke of wiper blade movement. The degree of deceleration is reduced in the course of the remaining period, thereby omitting troublesome or bothersome feeing of a driver seated in the vehicle.

23 Claims, 11 Drawing Sheets

WIPER SYSTEM

BACKGROUND OF THE INVENTION

1. Field of the Invention

This invention relates to improvements in a wiper system for wiping a windshield or window glass, and more particularly to such a wiper system in which the wiper blade moving characteristics is changeably controlled in the going and/or returning strokes of one cycle of wiper blade movement.

2. Description of the Prior Art

Figure 1A:
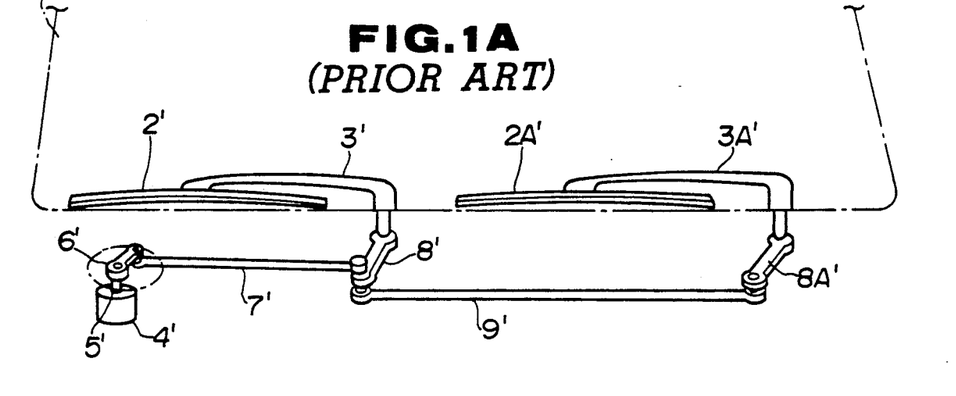
FIG. 1A is a perspective view of a conventional wiper system.
Figure 1B:
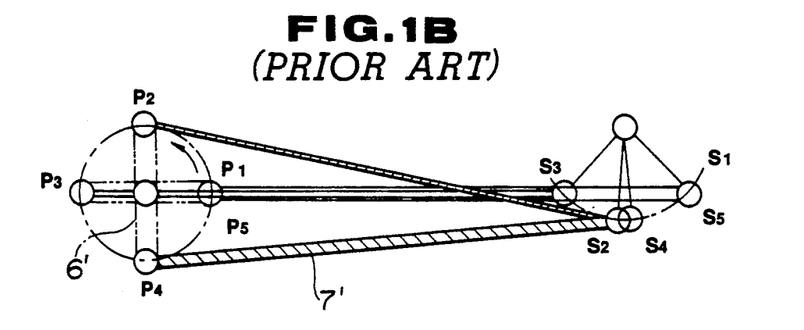
FIG. 1B is a diagrammatic view showing an operation manner of the wiper system of FIG. 1A.

Hitherto a variety of wiper systems have been proposed and put into practical use. A typical one of them is shown in FIGS. 1A and 1B of the drawings of the present application. In FIG. 1A, a conventional wiper system includes a wiper blade 2', 2A' which is in contact with the surface of a windshield or window glass 1' and movably attached to a wiper arm 3', 3A' which is driven by a wiper motor 4'. More specifically, a crank 6' is connected to a rotational or drive shaft 5' of the wiper motor 4'. The crank 6' is connected through a link 7' with a lever 8' on which the wiper arm 3' is fixed. The link 7' is further connected through a link 9' with a lever 8A' on which the a wiper arm 3A' is fixed.

Figure 1C:
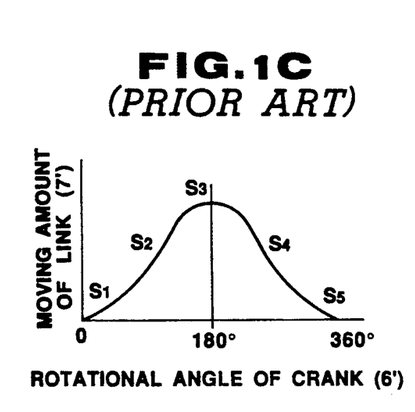
FIG. 1C is a graph showing a moving characteristics of a link for moving a wiper blade of the wiper system of FIG. 1A.
Figure 1D:
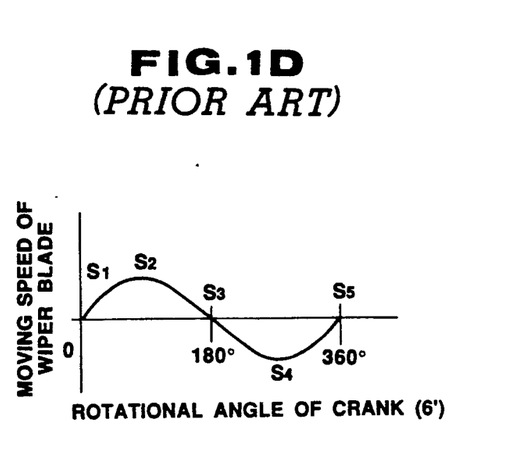
FIG. 1D is a graph showing a wiper blade moving speed characteristics of the wiper system of FIG. 1A.

As shown in FIG. 1B, when the crank 6' makes its half rotation along points $P_1'$, $P_2'$ and $P_3'$, the lever 8' swingingly moves a predetermined angle passing through an initiation position $S_1$, an intermediate position $S_2$ and a termination position $S_3$ under the action of the link 7'. In accordance with this movement of the lever 8', the wiper blade 2' makes its going stroke upon contacting with the surface of the windshield 1'. Subsequently, when the crank 6' makes its further half rotation along points $P_3'$, $P_4'$ and $P_5'$, the lever 8' swingably moves passing through the initiation position $S_3$ and an intermediate position $S_4$ to be restored to a termination point $S_5$. Thus, the wiper blade 2' makes its returning stroke, thereby completing one cycle of wiper blade movement or wiping the windshield. In this one cycle of the wiper blade movement, the displacement of the link 7' changes as shown in FIG. 1C, while the moving speed of the wiper blade 2', 2A' changes as shown in FIG. 1D in which the moving speed change is represented as a mere sine wave. In other words, the wiper blade moving or wiping characteristics of the conventional wiper system is such that the wiper blade moving speed gradually accelerated at a first half period and decelerated at a latter half period in each of the going and returning strokes of the wiper blade 2', 2A'.

However, difficulties have been encountered in the above conventional wiper system. That is, during wiping operation of the conventional wiper system whose wiper blade moving speed changes like a sine wave, the moving speed of the wiper blade is observed and felt approximately constant. Such moving speed characteristics is less in change, and therefore the driver feels it troublesome or bothersome, thereby increasing the feeling of fatigue or exhaustion of the driver. In addition, it is a recent trend that the area of window glasses is widened. In this regard, it has been required to reduce the feeling of troublesomeness due to the moving characteristics of the wiper blade of the wiper system.

Techniques of variable control of the wiper blade moving characteristics have been proposed and are disclosed in Japanese Patent Provisional Publication Nos. 62-198549 and 61-139542. However, even such techniques fail to improve the troublesomenss of movement of wiper blade.

SUMMARY OF THE INVENTION

It is an object of the present invention to provide an improved wiper system in which the movement of a wiper blade is not felt troublesome or bothersome, preventing a driver from feeling fatigued or exhausted.

Another object of the present invention is to provide an improved wiper system which variably controls the movement of a wiper blade in accordance with a predermined characteristics which does not provide troublesomeness feeling to a driver.

A wiper system of the present invention is comprised of a wiper arm to which a wiper blade is movably fixed. The wiper blade is movable with the wiper arm to wipe a surface of a window panel. A first device is provided to set a moving characteristics of the wiper blade including an acceleration section in which the moving speed of the wiper blade is accelerated toward the maximum speed, and a deceleration section in which the moving speed of the wiper blade is decelerated from a maximum speed. The deceleration section is after the acceleration section in time of movement of the wiper blade and has a deceleration reducing part in which the deceleration in the moving speed of the wiper blade is reduced relative to that at another part of said deceleration section which part is before the deceleration reducing part in time of movement of the wiper blade. Additionally, a second device is provided to drive the wiper arm to move the wiper blade in accordance with the wiper blade moving characteristics.

Accordingly, the movement of the wiper blade is variably controlled in a manner to sharply reduce the degree of deceleration in the course of the deceleration in a stroke of a cycle of the wiper blade movement, in which there arises a clear and large observable change in moving speed of the wiper blade. The thus controlled wiper blade moving manner or characteristics reduces the troublesome or bothersome feeling of the driver. More specifically, the moving speed of the wiper blade is made high at a major part of wiping operation of the wiper blade, and therefore the visibility in front of the driver is improved. Additionally, according to an organoleptic evalution experiment, it has been confirmed that the movement of the wiper blade in accordance with the above characteristics is felt rythmical and modulatory by major panelists, thereby greatly contributing to reducing a fatigue feeling and improving a high quality feeling of the wiper system.

Since the moving characteristics of the wiper blade of the present invention is set to have the deceleration reducing part in the course of the deceleration of the wiper blade movement, an inertia force due to a high speed wiper blade movement is effectively absorbed thereby to lower a reaction of the wiper blade at a terminal point of the wiper blade movement.

DETAILED DESCRIPTION OF THE INVENTION

Figure 2:
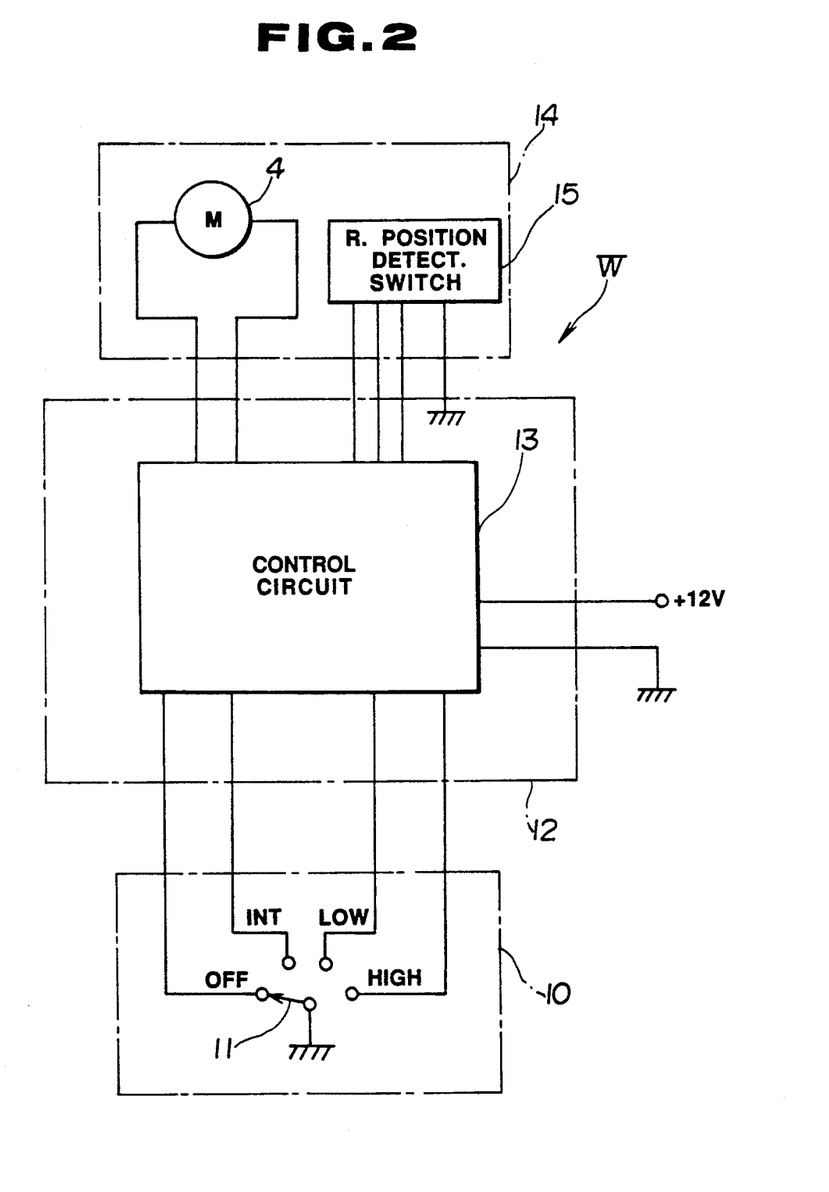
FIG. 2 is a diagrammatic view of an electric circuit forming part of an embodiment of a wiper system in accordance with the present invention.
Figure 3A:
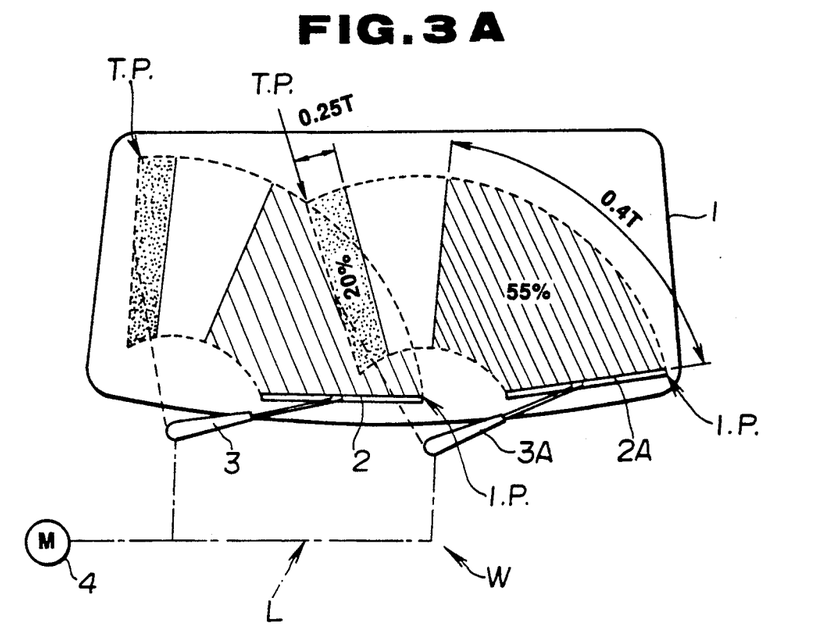
FIG. 3A is a schematic illustration showing a wiper blade moving characteristics of the embodiment of FIG. 2, in a going stroke of a cycle of the wiper blade movement.
Figure 3B:
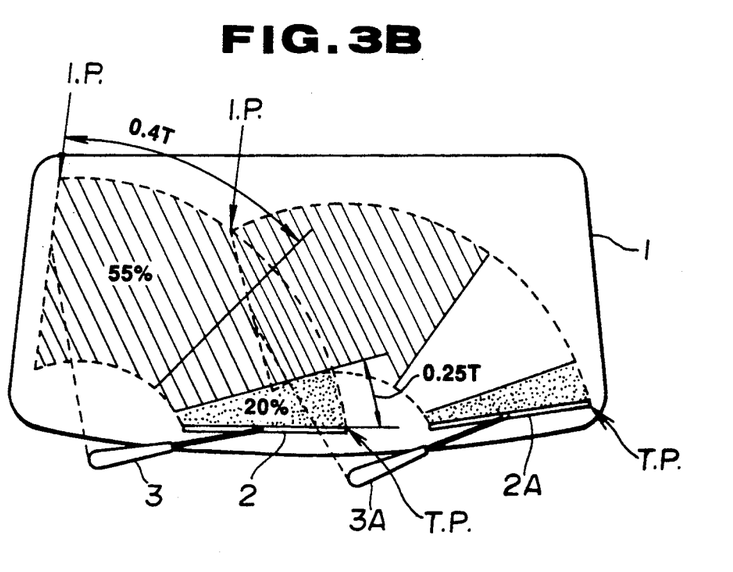
FIG. 3B is a schematic illustration similar to FIG. 3A but showing the same wiper blade moving characteristics as that in FIG. 3A but in a returning stroke of the wiper blade movement cycle.

Referring now to FIGS. 2, 3A and 3B of the drawings, a wiper system of the present invention is illustrated by the reference character W. The wiper system W in this embodiment is for an automotive vehicle though not shown. The wiper system W comprises a wiper blades 2, 2A for wiping the surface of a windshield or front window glass 1. Each wiper blade 2, 2A is movably attached to a wiper arm 3, 3A at its one or free end section. The other end or base end section of the wiper arm 3, 3A is pivotally supported on a vehicle body (not shown). The wiper arms 3, 3A are connected with each other to move simultaneously and connected through a link mechanism L to a wiper motor 4. Accordingly, each wiper arm 3, 3A is swingingly movable so that the wiper blade 2, 2A is swingingly movable thereby to wipe the surface of the windshield 1.

As shown in FIG. 2, the wiper motor 4 is electrically connected with a control circuit 13 to which a wiper switch 10 is electrically connected. The wiper switch 10 is provided with a switch element 11 which is adapted to output a signal to the control circuit 13. The control circuit 13 is arranged to control or change the rotational speed of the wiper motor 4 in accordance with the signal input from the switch element 11. The switch 10 has switch positions of "OFF" (switching OFF), "INT" (intermittent operation mode), "LOW" (low speed operation mode), and "HIGH" (high speed operation mode). The wiper motor 4 forms part of a motor section 14 including a rotational position detecting switch 15 for detecting a rotational position of the wiper motor 4. In this connection, the control circuit 13 is arranged to make a feedback control of the rotational speed of the wiper motor 4 in response to a signal (representative of the rotational position of the motor 4) from the rotational position detecting switch 15.

In this embodiment, the control circuit 13 is arranged to controllably change the rotational speed of the motor 4 as illustrated in FIGS. 3A and 3B. In FIGS. 3A and 3B, assuming that a time required for movement of the wiper blade 2, 2A from an initial position (I.P.) to a terminal position (T.P.) is T; and an area wiped by the wiper blade 2, 2A is S, the area of 0.55S is wiped for the time of 0.4T in an initial period of wiping, the area of 0.25S is wiped for the time of 0.35T in an intermediate period of wiping, and the area of 0.20S is wiped for the time of 0.25T in a terminal period of wiping.

Figure 4:
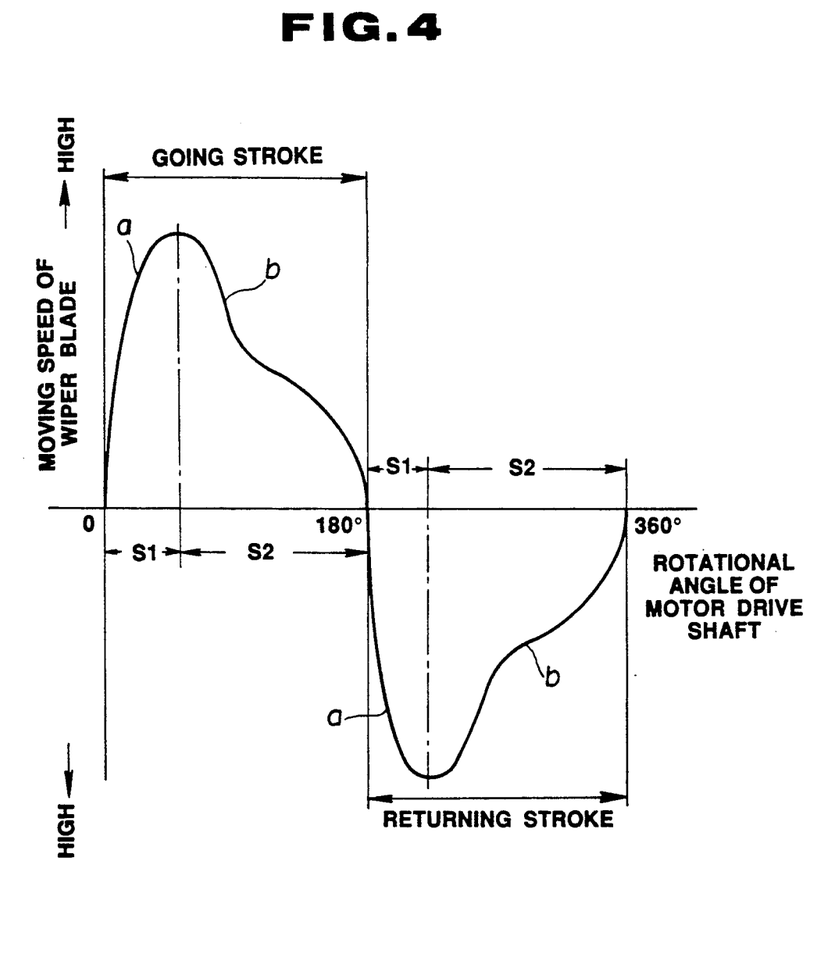
FIG. 4 is a graph showing a moving characteristics of the wiper blade of the wiper system of FIG. 2.
Figure 5A:
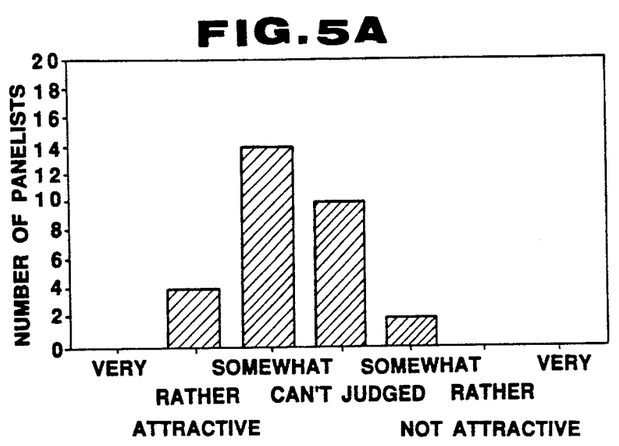
FIGS. 5A to 5E are graphs showing the results of an experiment of organoleptic evaluation for the wiper system of FIG. 2.
Figure 5B:
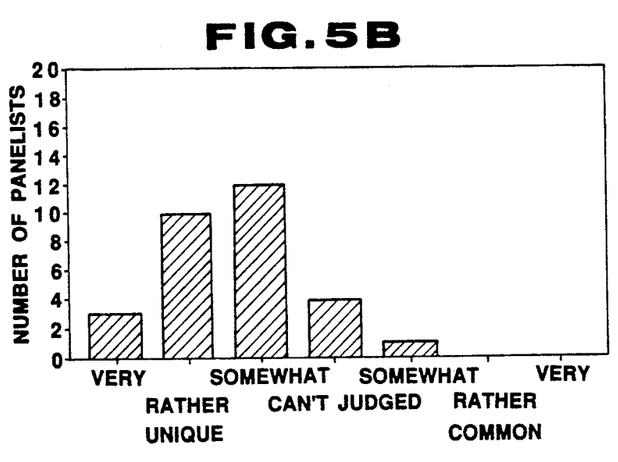
Figure 5C:
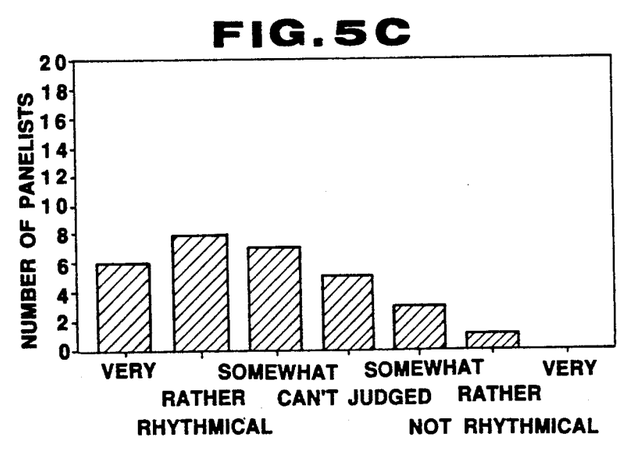
Figure 5D:
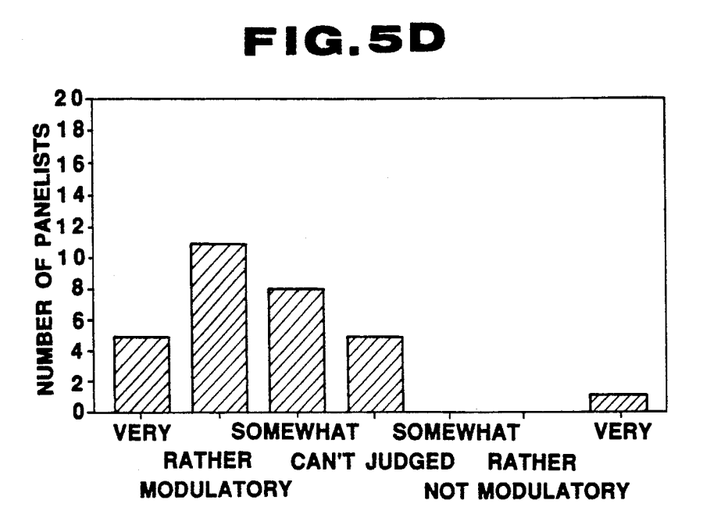
Figure 5E:
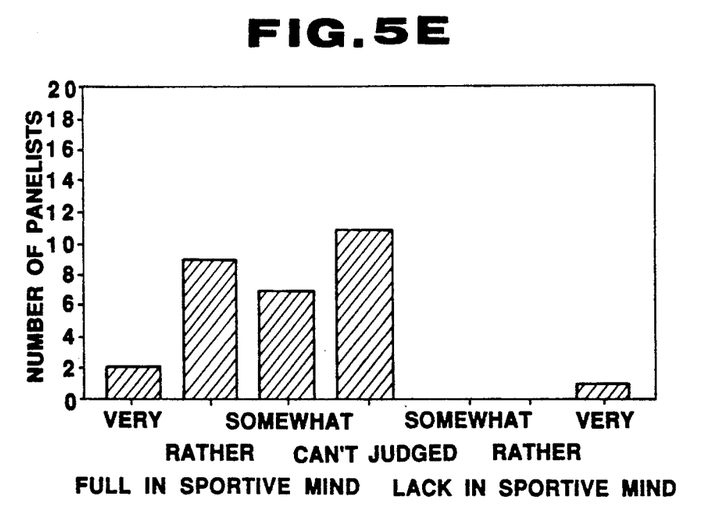

Accordingly, as shown in FIG. 3A illustrating the movement of the wiper blade 2, 2A in a going stroke of a cycle of the wiper blade movement, the wiper blade 2, 2A is largely accelerated and decelerated in moving or wiping speed so as to move at a high speed in the initial period, thereby smoothly wiping the windshield 1 in front of a driver (not shown). More specifically, as shown in FIG. 4, the wiper blade moving speed is accelerated the initial position (I.P.) or a rotational angle of 0 degree toward the maximum speed in an acceleration side $S_1$ and decelerated from the maximum speed in a deceleration side $S_2$. In the course of the deceleration in the deceleration side $S_2$, the wiper blade 2, 2A is shaply decreased in deceleration, and then again increased in deceleration toward its stoppage. Finally, the wiper blade 2, 2A reaches the terminal position (T.P.) or a rotational angle of 180 degrees. The rotational angle is of the rotational or drive shaft (not shown) of the motor 4. The wiper arms 3, 3A are drivably connected through the link mechanism L to the drive shaft of the motor 4.

Similarly, in a returning stroke in the movement of the wiper blade 2, 2A as shown in FIG. 3B, the wiper blade 2, 2A moves at a high speed from the initial position (I.P.) to smoothly wipe the windshield 1 in front of the driver in the initial period, and then largely reduced in deceleration at in the course of the deceleration in the deceleration side so as to be decelerated in stepwise as illustrated in FIG. 4. Finally, the wiper blade 2, 2A reaches to the terminal position (T.P.).

Thus, both in the going and returning strokes of the wiper blade movement, the wiper blade 2, 2A takes the following wiping characteristics: The wiper blade 2, 2A moves across the forward of the driver at a high speed to wipe the windshield 1, and then be observed or appeared to become approximately constant at moving speed in the course of the deceleration. Thereafter, the wiper blade 2, 2A decelerates toward the terminal position. In other words, the wiping or moving characteristics of the wiper blade 2, 2A has an acceleration section indicated by a line segment a in FIG. 4 and a deceleration section indicated by a line segment b. The acceleration section is in the acceleration side S1 while the deceleration section is in the deceleration side S2. The deceleration section has a part in which deceleration is sharply reduced, which part resides at a central part of the deceleration section b.

Accordingly, the movement of the wiper blade 2, 2A has the characteristics having a large change (in moving speed) which is clearly observable by the driver. That is, a rapid movement of the wiper blade 2, 2A in the initial period exhibits a rapid feeling while improving the visibility in front of the driver. The approximately constant speed movement of the wiper blade upon naked-eye observation in the course of wiping exhibits a stability feeling. A rapid movement toward the terminal position in the terminal period exhibits a stability feeling.

Such effects were supported by experiments for an organoleptic evaluation. In these experiments, with respect to "troublesomeness (bothersome feeling)" to be felt by the driver, the wiper blade movement mode or characteristics (as shown in FIGS. 3A, 3B and 4) according to the characteristics of the present invention was compared with a wiper blade movement mode of a conventional wiper system as shown in FIG. 1D. As a result of the experiment, it was confirmed that the wiper blade moving characteristics of the present invention provided excellent effects in organoleptic evalution, sharply reducing the "troublesomeness" in driving in rain as compared with the conventional wiper blade movement characteristics. The experiments will be discussed hereinafter.

The result of an experiment is shown in FIGS. 5A to 5E, and the detail of the experiment is shown in Table 1. It was supposed insufficient to ask a panelist merely whether the movement of the wiper blade is troublesome or not, in order to accomplish the organoleptic evalution of "troublesomeness". It was believed effective for the evaluation, that a plurality of questions (with evaluation terms) representing many sides of the term "troublesomeness" were made to the panelist. Additionally, the inventors confirmed that the evaluation terms greatly contribute to represent the "troublesomeness". In view of the above, the questions were made to 30 panelists as to the following five evaluation terms which totally represented "troublesomeness":

(a) Rhythmical or not
(b) Modulatory or not
(c) Attractive or not
(d) Unique or common
(e) Full or lack in sportive mind As a result of the experiment, it was confirmed that the wiper blade movement characteristics of the present invention were excellent in terms of "attractive", "unique", "rhythmical", "modulatory" and the like as compared with the conventional wiper blade movement characteristics. Additionally, the panelists offered the comments that the wiper blade movement characteristics of the present invention were "considerably good upon being habituated", "good in frontal visibility", "more effective in the intermittent operation mode", and the like. These commnets highly evaluate the wiper blade movement characteristics of the present invention. The total of the above facts demonstrates that the wiper blade movement according to the characteristics of the present invention can remove the "troublesomeness", while providing the image of high quality. Therefore, according to the wiper blade movement characteristics of the present invention, the image of a high quality car can be made without a considerable production cost increase.

TABLE 1

Item of Experiment
Organoleptic evaluation test on a wiper system having a wiper blade movement characteristics different from those of conventional wiper systems.
Method of Experiment
The movement of the wiper blade having the movement characteristics of the wiper system of the present invention and that of the conventional wiper system were alternately TABLE 1-continued observed by a panelist seated on a driver's seat, upon which an evaluation of the wiper system of the present invention was written on an evaluation blank form by the panelis.
Number of panelists
30
Result of Experiment
Improved Points in wiper blade mevement over conventional wiper system:
Attractive;
Unique;
Rhythmical;
Modulatory;
Beautiful in movement;
Full in sportive mind;
Good in visibility;
Important items in comments:
Appeared good upon being habituated (7 panelists);
Good in visibility because the wiper blade passing the front of the driver at a high speed (good in front visivility) (5 panelists);
More effective in intermittent operation mode (2 panelists);
Rhythmical and high in moving speed (2 panelists);
Natural in movement and similar in movement to human as compared with the conventional wiper system;
Less in monotonous movement and therefore appreared good in nap preventing effect during driving in rain;
Felt to result from intelligence of a person who devised the wiper system of the present invention;
Full in lively movement feeling so as to provide vitality;
Felt very interesting;
Felt so that no chattering noise is generated.

Figure 6A:
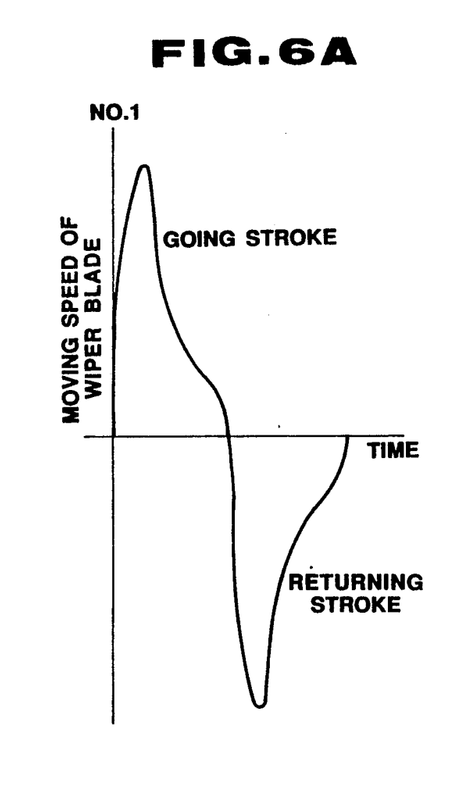
FIGS. 6A to 6F are graphs similar to the graph of FIG. 4 but showing a variety of moving characteristics of wiper blade, used in the experiment of organoleptic evaluation for the wiper system.
Figure 6B:
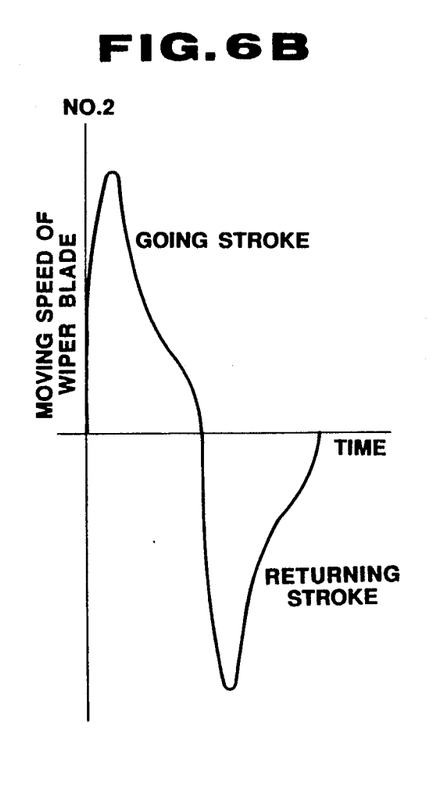
Figure 6C:
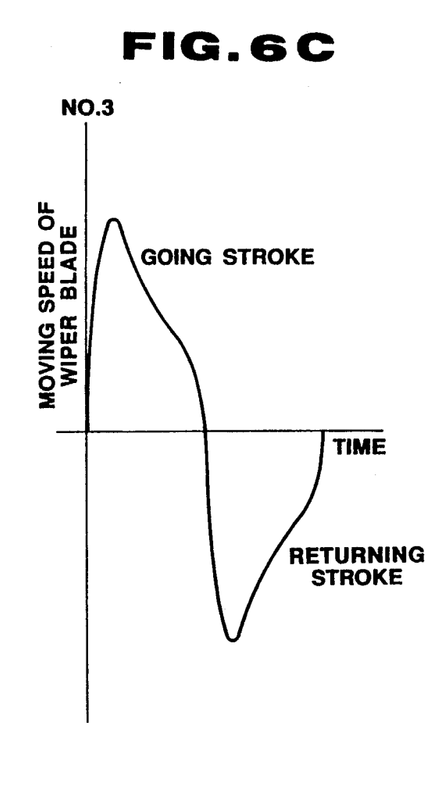
Figure 6D:
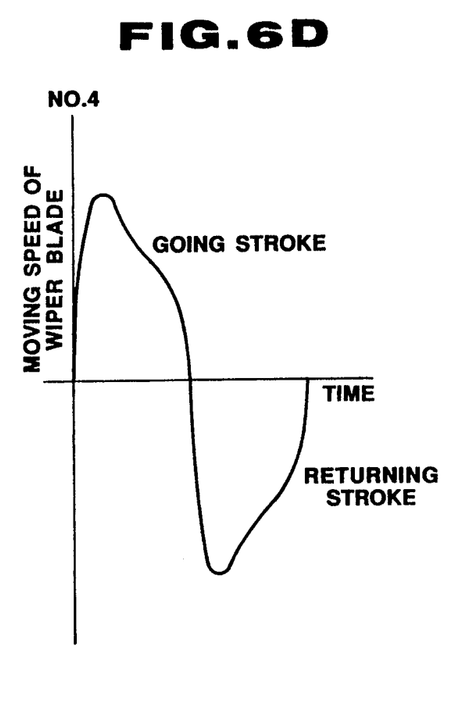
Figure 6E:
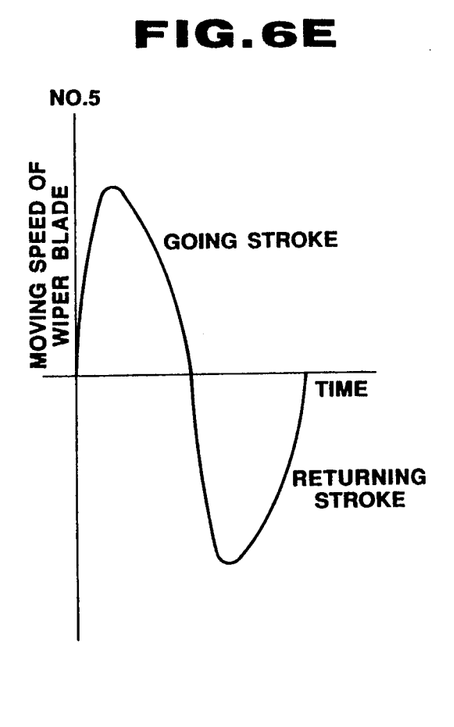
Figure 6F:
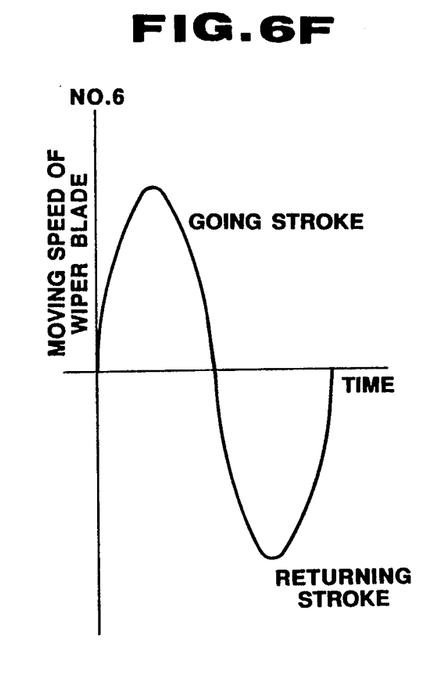

Another experiment for organoleptic evaluation was conducted to compare a variety of wiper blade moving patterns as shown in FIGS. 6A to 6F as to the "troublesomeness" particularly at a time where the wiper blade is decelerated after being rapidly accelerated. The pattern No. 1 in FIG. 6A has a large observable change in wiper blade moving speed, whereas the pattern No. 6 in FIG. 6F is simple in wiper blade moving speed change and corresponds to the conventional wiper blade moving characteristics shown in FIG. 1D. The patterns Nos. 2 to 5 in FIGS. 5B to 5E are changed little by little in wiper blade moving characteristics between the patterns Nos. 1 and 2. An organoleptic evaluation test was conducted, in which wiper blade movements of the patterns Nos. 1 to 6 were observed by four panelists P-1, P-2, P-3 and P-4. The results of the organoleptic evaluation test by the panelists are shown in Table 2.

TABLE 2

| Evaluation patterns: 5 | | | | | |
|---|---|---|---|---|---|
| Evaluation standard (relative to conventional wiper system): | | | | | |
| Excellent | | | A . . . point 3 | | |
| Better | | | B . . . point 2 | | |
| Good | | | C . . . point 1 | | |
| Same | | | D . . . point 0 | | |
| Panelist | No. 1 | No. 2 | No. 3 | No. 4 | No. 5 | No. 6 |
| P-1 | B | A | C | D | D | — |
| P-2 | B | A | C | D | D | — |
| P-3 | C | A | A | C | D | — |
| P-4 | A | B | C | D | D | — |
| Total point | 8 | 11 | 5 | 1 | 0 | — |

The above experiment revealed that the wiper blade moving patterns No. 1 (FIG. 6A), No. 2 (FIG. 6B) and No. 3 (FIG. 6C) exhibited good results without the "troublesomeness" as compared with the conventional pattern No. 6 (FIG. 6F). In addition, the inertia force due to a high speed movement of the wiper blade 2, 2A in the initial period is absorbed at an intermediate constant speed range, and therefore there arises slight mechanical impact thereby to improve the life of the wiper system although the wiper arm and blade move at a high speed in the initial period of the going or returning stroke of the wiper blade movement.

Figure 7:
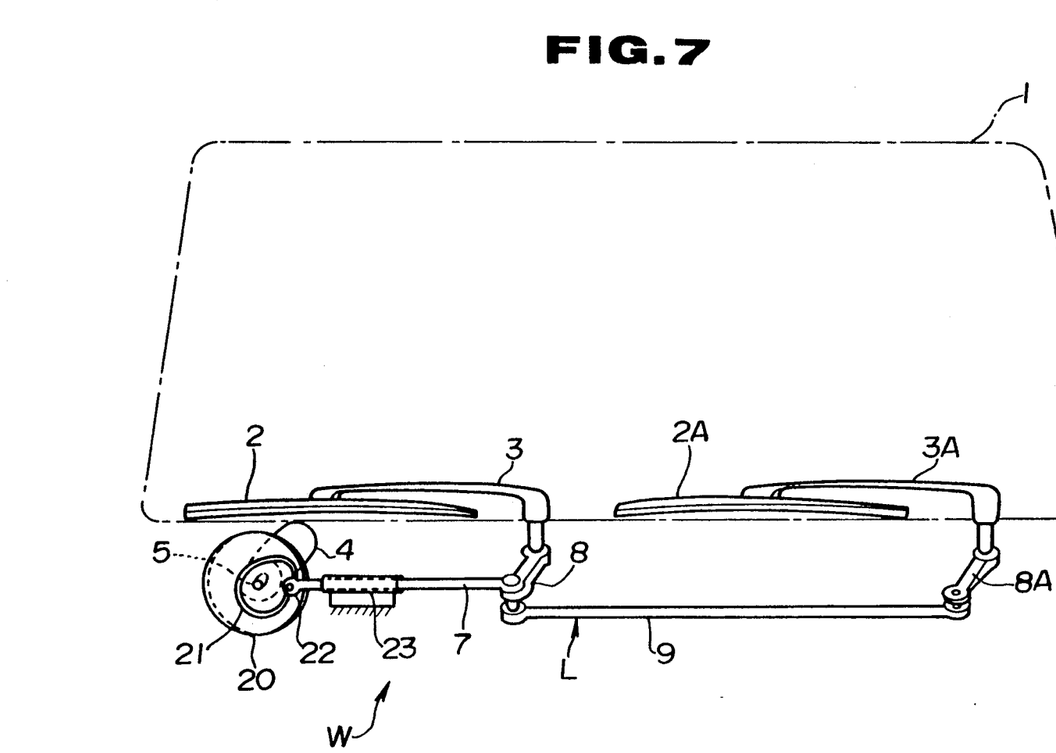
FIG. 7 is a perspective view of a wiper system of another embodiment of the wiper system in accordance with the present invention.
Figure 8A:
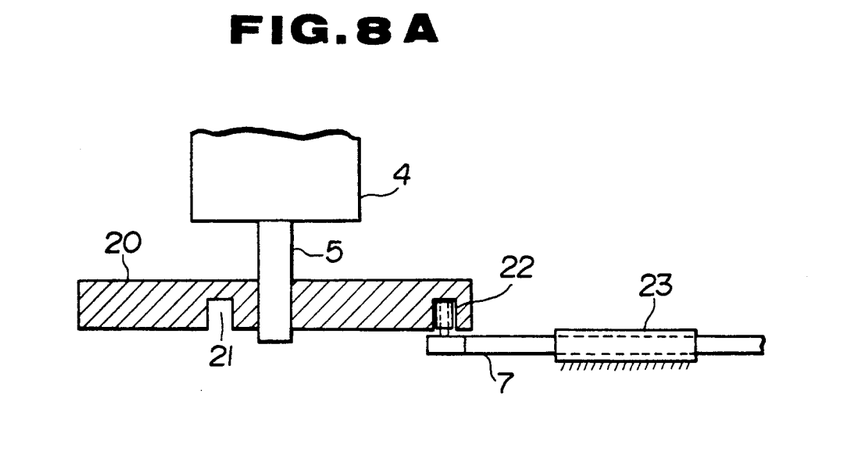
FIG. 8A is a fragmentary plan view, partly in section, of a part of the wiper system of FIG. 7, showing the mechanical relationship between a control disc and a link connected with a wipre arm.
Figure 8B:
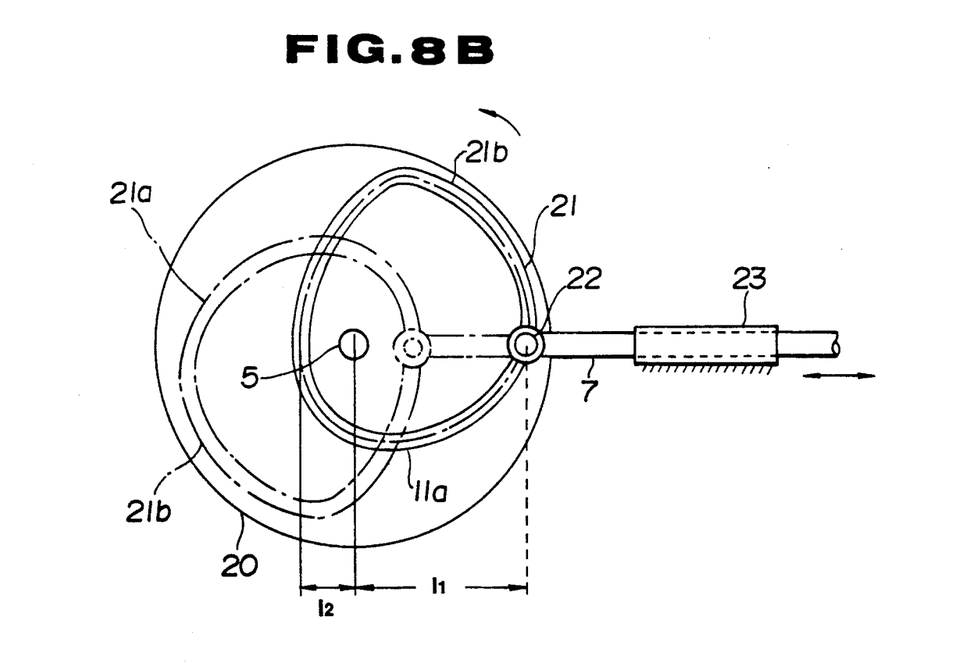
FIG. 8B is a front view of the part of FIG. 8A.

FIGS. 7, 8A and 8B illustrate another embodiment of the wiper system W according to the present invention which is similar to the embodiment of FIGS. 2, 3A and 3B with the exception that the wiper blade moving characteristics are mechanically set.

The wiper system W of this embodiment comprises a control disc 20 which is fixedly mounted on a rotatable or drive shaft 5 of the wiper motor 4. The drive shaft 5 is perpendicular to and fixedly secured at the center of the control disc 20. The control disc 20 is formed at its one side surface with a grooved cam 21 in which a roller 22 forming part of a link 7 is movably fitted. Accordingly, the link 7 moves in accordance with the shape of the grooved cam 21. The link 7 forming part of the link mechanism L is passed through a cylindrical guide 23 so that the movement of the link 7 is linearly restricted in left and right directions in FIGS. 7, 8A and 8B. The link 7 is movably connected with a lever 8 on which wiper arm 3 is fixedly mounted in a manner that the wiper arm 3 swingably moves in accordance with the leftward and rightward movements of the link 7. The link 7 is also connected through a link 9 with a lever 8A on which the wiper arm 3A is fixedly mounted in a manner that the wiper arm 3A swingingly moves in accordance with the leftward and rightward movements of the link 7.

Figure 9:
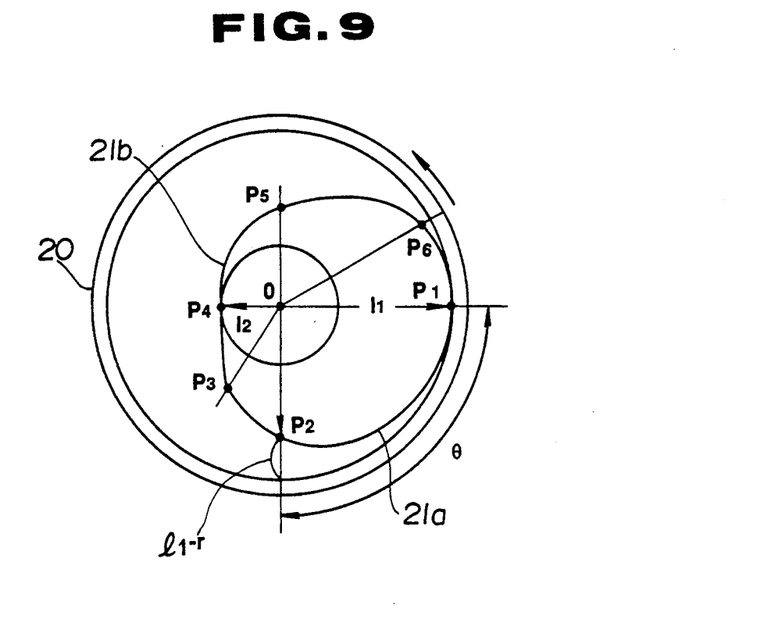
FIG. 9 is schematic view illustrating the shape of a grooved cam formed in the control disc.
Figure 10:
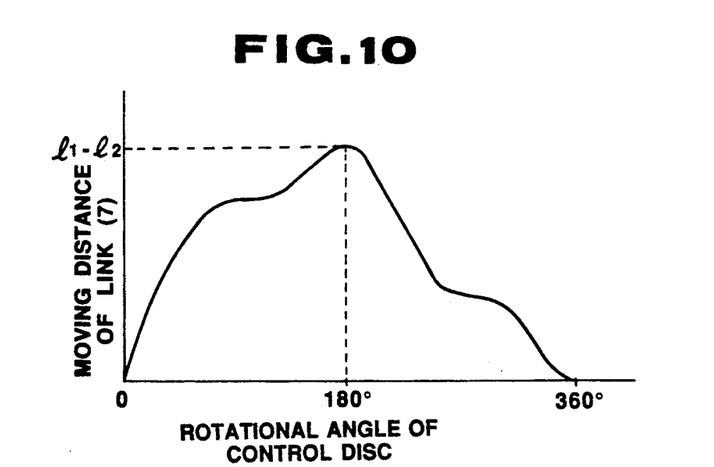
FIG. 10 is a graph showing a moving characteristics of the link of FIGS. 8A and 8B.

The shape of the grooved cam 21 will be discussed with reference to FIG. 9 showing a center line arrangement of the grooved cam 21.

The center line of the grooved cam 21 has a point $P_1$ at which the going stroke of the wiper blade 2, 2A is initiated or the returning stroke of the same is terminated. The point $P_1$ is located separate from the center O of the control plate 20 by a longest distance $l_1$. The grooved cam has a point $P_4$ at which the going stroke of the wiper blade 2, 2A is terminated or the returning stroke of the same is initiated. The point $P_4$ is separate from the center O of the control plate 20 by a shortest distance $l_2$. Accordingly, the grooved cam 21 includes a going stroke section 21a (only the center line shown) by which the going stroke of the wiper blade is made, and a returning stroke section 21b (only the center line shown) by which the returning stroke of the wiper blade is made also as shown in FIG. 8B. Thus, the groove cam 21 extends in peripheral and radial directions within ranges between the points $P_1$ and $P_2$, providing points $P_2$, $P_3$, $P_5$ and $P_6$ in the center line of the grooved cam 21.

It will be appreciated from the above, that the moving speed of the wiper blade 2, 2A is a function of a rotational angle $\theta$ in the peripheral direction of the control disc 20 and a displacement amount $l_1 - r$ in the radial direction of the control disc 20, in which r is the radius of a circle concentrical with the center O of the control disc 20 which circle passes one of the points of $P_1$ to $P_6$. Only such circles passing the points $P_1$ and $P_4$ are shown in FIG. 9. Accordingly, the moving speed of the wiper blade 2, 2A increases as the rotational angle $\theta$ is smaller and the displacement amount $l_1 - r$ is larger.

As shown in FIG. 9, the control disc 20 rotates counterclockwise and therefore the roller 22 relatively moves first along the going stroke section 21a of the grooved cam 21 and thereafter along the returning stroke section 21b. During the first half rotation of the control disc 20, the roller 22 relatively moves along the going stroke section 21a through the points $P_1$, $P_2$, $P_3$ and $P_4$. The going stroke section 21a rapidly decreases in radius r from the point P1 to reach the point $P_2$, in which the moving speed of the wiper blade 2, 2A rapidly increases. Such a speed increase enlarges the inertia force in a driving system of the wiper arms and blades. In order to smoothly decelerate the moving speed of the wiper blade 2, 2A against the large inertia force, the going stroke section 21a curves passing through the point $P_3$ which is smaller in radius r and thereafter gradually decreases in radius r to reach $P_4$. During the latter half rotation of the control disc 20, the roller 22 relatively moves along the returning stroke section 21b of the grooved cam 21 which returning stroke section extends through the points $P_4$, $P_5$ and $P_6$ in which the radius r increases stepwise to return to the point $P_1$, in a similar manner to that during the first half rotation of the control disc 20.

Accordingly, the link 7 moves large in the initial period, small in the intermediate period and moderate at the terminal period in accordance with shape of the grooved cam 21a in each of the going and returning strokes of the wiper blade 2, 2'. As a result, the wiper blade moving characteristics of this embodiment are the same as that shown in FIG. 4.

The manner of operation of this embodiment will be discussed hereinafter.

Before operation of the wiper system W, the control disc 20 is stopping at a rotational position indicated in solid lines in FIG. 8B, and therefore the roller 22 of the link 7 is movably fitted in the grooved cam 11 at a position corresponding to the point $P_1$ so that the link 7 is located at the rightmost position. As a result, the wiper arm 3 and the wiper blade 2 are being stored at a downward and the leftmost position as shown in FIG. 7. When the wiper switch is switched ON to operate the motor 4 so that the drive shaft 5 rotates at a constant speed, the control disc 20 rotates in the counterclockwise direction as indicated by an arrow in 8B. Then, the link 7 is first pulled leftward so that the wiper blade 2, 2A swinginly moves upward under the effect of the grooved cam going stroke section 21a, thus initiating the wiping of the surface of the windshield 1 in the going stroke of the wiper blade movement. At this time, the wiper blade 2, 2A moves at a high speed in the initial period thereby to smoothly wipe the windshield in front of the driver by virtue of a large displacement amount of the link 7 due to the shape of the groove cam going stroke section 21a. Such movement of the wiper blade 2, 2A corresponds to the first half period (including the acceleration side S1) of the going stroke of the wiper blade movement as shown in FIG. 4. Thereafter, the moving speed of the wiper blade 2, 2A is decelerated stepwise to reach the terminal position $P_4$, which corresponds to the latter half period (forming part of the deceleration side S2) the going stroke of the wiper blade movement as shown in FIG. 4. Then, the control disc 20 upon rotation reaches a position at which the grooved cam 21 is indicated by dot-dash lines in FIG. 8B.

Subsequently, the roller 22 of the link 7 comes into fit in the grooved cam returning stroke section 21b, and therefore the link 7 is pushed rightward in FIGS. 7, 8A and 8b, so that the wiper blade 2, 2A moves downward to initiate the returning stroke of the wiping of the windshield by the wiper blade 2, 2A. Also in this returning stroke, the wiper blade 2, 2A moves at a high speed in the initial period of the wiper blade movement thereby to smoothly wipe the windshield 1 in front of the driver. Then, the moving speed of the wiper blade 2, 2A is decelerated upon being reduced in deceleration in the course of the deceleration at the side S2 as shown in FIG. 4 thereby to be decelerated stepwise to finally reach the terminal position $P_1$. Thus, both in the going and returning strokes of the wiper blade movement, the wiper blade 2, 2A moves across the front of the driver at a high speed at the initial period of the stroke to wipe the windshield 1, then moves at the approximately constant speed, and finally decelerates toward the terminal position $P_1$. Accordingly, the wiper system of this embodiment exhibits the same effect as that of the embodiment of FIGS. 2, 3A and 3B, maintaining the rotational speed of the wiper motor 4 at a constant level therey to minimize noise of the motor 4.

While only two embodiments have been shown and described, it will be appreciated that the scope of the present invention is not limited by the description and figures of them so that various modifications may be made in the invention without departing from the spirit and scope of the present invention. For example, the stepwise control of the moving speed of the wiper blade in the embodiments may be applied only to one of the going and returning strokes of the wiper blade movement. Additionally, the principle of the present invention may be applied to a wiper system for a rear window of an automotive vehicle, and also may be applied to a wiper system for windshields or window glasses of vehicles other than the automotive vehicles, ships and airplanes.

What is claimed is:

1. A wiper system comprising:
   a wiper arm;
   a wiper blade movably fixed to said wiper arm, said wiper blade being movable with said wiper arm to wipe a surface of a window panel;
   means for setting moving characteristics during a stroke of said wiper blade, said characteristics including an acceleration section in which a moving speed of said wiper blade is increased from zero to a maximum speed, and a deceleration section in which the moving speed of said wiper blade is decreased from the maximum speed to zero,
   wherein a graphical representation of the moving characteristics in terms of moving speed of the wiper blade versus time includes a convex portion during the acceleration section and a concave portion followed by a convex portion during the deceleration section; and
   means for driving said wiper arm to move said wiper blade in accordance with said wiper blade moving characteristics.

2. A wiper system as claimed in claim 1, wherein, in the graphical representation, the wiper blade achieves said maximum speed less than halfway through a sum of the time of the acceleration section plus the deceleration section.

3. A wiper system as claimed in claim 2, wherein the wiper blade achieves said maximum speed less than one third through the sum of the time of the acceleration section plus the deceleration section.

4. A wiper system as claimed in claim 1, wherein the graphical representation is as depicted in FIG. 6A.

5. A wiper system as claimed in claim 1, wherein the graphical representation is as depicted in FIG. 6B.

6. A wiper system as claimed in claim 1, wherein the graphical representation is as depicted in FIG. 6C.

7. A wiper system as claimed in claim 1, wherein a sum of the time for the acceleration section plus the deceleration section is T;
   wherein, during an initial period of 0.4T, about 55% of said surface is wiped;
   wherein, during a terminal period of 0.25T, about 20% of said surface is wiped; and
   wherein, during an intermediate period of 0.35T, about 25% of said surface is wiped.

8. A wiper system comprising:
   a wiper arm;
   a wiper blade movably fixed to said wiper arm, said wiper blade being movable with said wiper arm to wipe a surface of a window panel;
   means for setting moving characteristics during a stroke of said wiper blade, said stroke being one of a going stroke and a returning stroke, said characteristics including an acceleration section in which a moving speed of said wiper blade is increased from zero to a maximum speed, and a deceleration section in which the moving speed of said wiper blade is decreased from the maximum speed to zero,
   said deceleration section being after said acceleration section in time of movement of said wiper blade and having a first deceleration increasing part, a second deceleration increasing part, and a deceleration reducing part at which the deceleration in the moving speed of the wiper blade is reduced relative to that at said first and second deceleration increasing parts of said deceleration section, said deceleration reducing part being between said first and second deceleration increasing parts in time of movement of said wiper blade;
   wherein a graphical representation of the deceleration section of the stroke in terms of moving speed of the wiper blade as a function of a rotational angle of a wiper arm drive shaft includes a concave portion during the deceleration reducing part and a convex portion during each of the first and second deceleration increasing parts; and
   means for driving said wiper arm to move said wiper blade in accordance with said wiper blade moving characteristics.

9. a wiper system as claimed in claim 8, wherein the deceleration of said deceleration increasing parts increases relative to that at said deceleration reducing part.

10. A wiper system as claimed in claim 8, wherein said wiper blade moving characteristics setting means includes means for setting said moving characteristics in at least one of a going stroke and a returning stroke of a cycle of movement of said wiper blade.

11. A wiper system as claimed in claim 10, wherein said wiper blade moving characteristics setting means includes means for setting said moving characteristics both in said going stroke and said returning stroke of the cycle of the wiper blade movement.

12. A wiper system as claimed in claim 8, wherein said driving means includes a wiper motor for driving said wiper arm, and means for rotating said wiper motor in a manner to drive said wiper arm so as to move said wiper blade in accordance with said moving characteristics.

13. A wiper system as claimed in claim 12, wherein said wiper motor rotating means includes a control circuit for controllably changing a rotational speed of said wiper motor so as to move said wiper blade in accordance with said moving characteristics.

14. A wiper system as claimed in claim 8, wherein said driving means includes a wiper motor for driving said wiper arm, said wiper motor having a drive shaft, wherein said wiper blade moving characteristics setting means includes a control plate fixedly mounted on said motor drive shaft to rotate with said motor drive shaft, said control plate being formed with a grooved cam by which said wiper arm is driven to move said wiper blade in accordance with said moving characteristics.

15. A wiper system as claimed in claim 14, wherein said driving means further includes a link mechanism for mechanically connecting said control plate and said wiper arm, a part of said link mechanism being movably fitted in the grooved cam of said control plate.

16. A wiper system as claimed in claim 14, wherein said wiper motor rotates at a constant speed.

17. A wiper system as claimed in claim 8, wherein, in the graphical representation, the wiper blade achieves said maximum speed less than halfway through the sum of the rotational angle of the acceleration section plus the deceleration section.

18. A wiper system as claimed in claim 17, wherein the wiper blade achieves said maximum speed less than one third through the sum of the rotational angle of the acceleration section plus the deceleration section.

19. A wiper system as claimed in claim 8, wherein the graphical representation is as depicted in FIG. 4.

20. A wiper system comprising:
a wiper arm;
a wiper blade movably fixed to said wiper arm, said wiper blade being movable with said wiper arm to wipe a surface of a window panel;
means for setting moving characteristics during a stroke of said wiper blade, said characteristics including an acceleration section in which the moving speed of said wiper blade is rapidly increased from zero to a maximum speed, and a deceleration section in which the moving speed of said wiper blade is decreased from the maximum speed to zero,
said deceleration section being after said acceleration section in time of movement of said wiper blade and having a first deceleration increasing part during which the moving speed of said wiper blade is rapidly decreased, a second deceleration increasing part during which the moving speed of said wiper blade is rapidly decreased, and a deceleration reducing part at which the deceleration in the moving speed of the wiper blade is reduced relative to each deceleration increasing part,
said deceleration reducing part being between said first and second deceleration increasing parts in time of movement of said wiper blade; and
means for driving said wiper arm to move said wiper blade in accordance with said wiper blade moving characteristics.

21. A wiper system comprising:
a wiper arm;
a wiper blade movably fixed to said wiper arm, said wiper blade being movable with said wiper arm to wipe a surface of a window panel;
means for setting moving characteristics during a stroke of said wiper blade, said characteristics including an acceleration section in which the moving speed of said wiper blade is accelerated toward a maximum speed, and a deceleration section in which the moving speed of said wiper blade is decelerated from the maximum speed, said deceleration section being after said acceleration section in time of movement of said wiper blade and having a deceleration reducing part at which the deceleration in the moving speed of the wiper blade is reduced relative to that at another part of said deceleration section which part is before said deceleration reducing part in time of movement of said wiper blade;
said moving characteristics setting means including means for setting wiping areas of said wiper blade during a stroke of said wiper blade, said wiping areas being formed on the surface of said window panel and wiped with said wiper blade,
said wiping areas including a first wiping area at which a wiping action of said wiper blade is initiated, a second wiping area located after said first wiping area in time of movement of said wiper blade, and a third wiping area located after said second wiping area in time of movement of said wiper blade, the wiping action of said wiper blade being terminated at said third wiping area,
said second wiping area having an area smaller than that of said first wiping area and larger than said third wiping area, an average moving speed of said wiper blade at said third wiping area being lower than that at said first wiping area and higher than that at said second wiping area; and
means for driving said wiper arm to move said wiper blade in accordance with said wiper blade moving characteristics.

22. A wiper system as claimed in claim 21, wherein said second wiping area has a wiping time which is shorter than the wiping time of said first wiping area and longer than the wiping time of said third wiping area, said wiping time being a time during which said wiper blade wipes the window panel surface at each wiping area.

23. A wiper system as claimed in claim 21, wherein said first wiping area has an area which is about one-half of a total of said first, second, and third wiping areas; and
wherein said second and third wiping areas each have an area each which is about one-fourth of the total of said first, second, and third wiping areas.

* * * * *